United States Patent
Liu et al.

(10) Patent No.: US 10,629,236 B1
(45) Date of Patent: Apr. 21, 2020

(54) SLIDER GAS-BEARING SURFACE DESIGNS TO MITIGATE EFFECTS OF SMEAR IN HEAT-ASSISTED MAGNETIC RECORDING

(71) Applicant: Western Digital Technologies, Inc., San Jose, CA (US)

(72) Inventors: Nan Liu, San Jose, CA (US); Weidong Huang, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/188,260

(22) Filed: Nov. 12, 2018

(51) Int. Cl.
*G11B 5/60* (2006.01)
*G11B 11/24* (2006.01)
*G11B 5/012* (2006.01)
*G11B 5/31* (2006.01)
*G11B 5/00* (2006.01)

(52) U.S. Cl.
CPC ............. *G11B 11/24* (2013.01); *G11B 5/012* (2013.01); *G11B 5/3133* (2013.01); *G11B 5/6064* (2013.01); *G11B 5/6082* (2013.01); *G11B 5/6088* (2013.01); *G11B 2005/0021* (2013.01)

(58) Field of Classification Search
CPC ... G11B 5/3133; G11B 5/6064; G11B 5/6082; G11B 5/6088
USPC ....... 360/125.31, 234.5, 235.7, 236.1, 236.5, 360/236.8
See application file for complete search history.

(56) References Cited

U.S. PATENT DOCUMENTS

| | | | |
|---|---|---|---|
| 7,525,765 B2 * | 4/2009 | Kurita | G11B 5/012 360/235.4 |
| 8,018,685 B2 * | 9/2011 | Shimazawa | G11B 5/4833 360/125.31 |
| 8,339,740 B2 | 12/2012 | Zou et al. | |
| 8,374,063 B2 | 2/2013 | Tanaka et al. | |
| 9,001,629 B1 | 4/2015 | Yuan et al. | |
| 9,165,576 B2 | 10/2015 | Cheng et al. | |
| 9,343,088 B2 | 5/2016 | Guler et al. | |
| 9,484,051 B1 | 11/2016 | Krichevsky et al. | |
| 2003/0128471 A1 | 7/2003 | Bolasna et al. | |

(Continued)

OTHER PUBLICATIONS

Rong Ji, Baoxi Xu, Zhanhong Cen, Ji Feng Ying, and Yeow Teck Toh, "Thermal effects on transducer material for heat assisted magnetic recordingapplication," Journal of Applied Physics 117, 17A918 (2015).

(Continued)

*Primary Examiner* — Jefferson A Evans
(74) *Attorney, Agent, or Firm* — Jacobsen IP Law; Krista S. Jacobsen

(57) ABSTRACT

Disclosed herein are sliders having air-bearing surface (ABS) designs to mitigate the effects of smear on near-field transducers used in data storage devices, and data storage devices comprising such sliders. A slider comprises a leading edge, a trailing edge, a NFT, and an ABS with features to increase oxygen concentration near the NFT. The ABS comprises a channel configured to direct gas in a direction from the leading edge toward the trailing edge and a funnel region connected to the channel, disposed between the channel and the NFT, and configured to receive gas from the channel. In an ABS view of the slider, a width of the funnel region along a longitudinal axis passing through the NFT monotonically increases with distance from the NFT.

20 Claims, 13 Drawing Sheets

(56) References Cited

U.S. PATENT DOCUMENTS

| | | | |
|---|---|---|---|
| 2004/0174638 A1* | 9/2004 | Pendray | G11B 5/6005 360/235.7 |
| 2004/0201923 A1* | 10/2004 | Rao | G11B 5/3136 360/235.7 |
| 2005/0280943 A1* | 12/2005 | Inoue | G11B 5/6082 360/236.2 |
| 2006/0023358 A1* | 2/2006 | Huang | G11B 5/6005 360/235.6 |
| 2006/0187564 A1* | 8/2006 | Sato | G11B 5/1278 360/59 |
| 2007/0121251 A1* | 5/2007 | Yoshida | G11B 5/6005 360/236.3 |
| 2007/0236838 A1* | 10/2007 | Knigge | G11B 5/6005 360/235.8 |
| 2009/0097364 A1* | 4/2009 | Tawa | G11B 5/314 369/13.17 |
| 2012/0213042 A1* | 8/2012 | Aoki | G11B 5/314 369/13.33 |
| 2017/0221511 A1 | 8/2017 | Dai et al. | |

OTHER PUBLICATIONS

Samarth Bhargava and Eli Yablonovitch, "Lowering HAMR Near-Field Transducer Temperature via Inverse Electromagnetic Design," IEEE Transactions on Magnetics, vol. 51, No. 4, Apr. 2015.

* cited by examiner

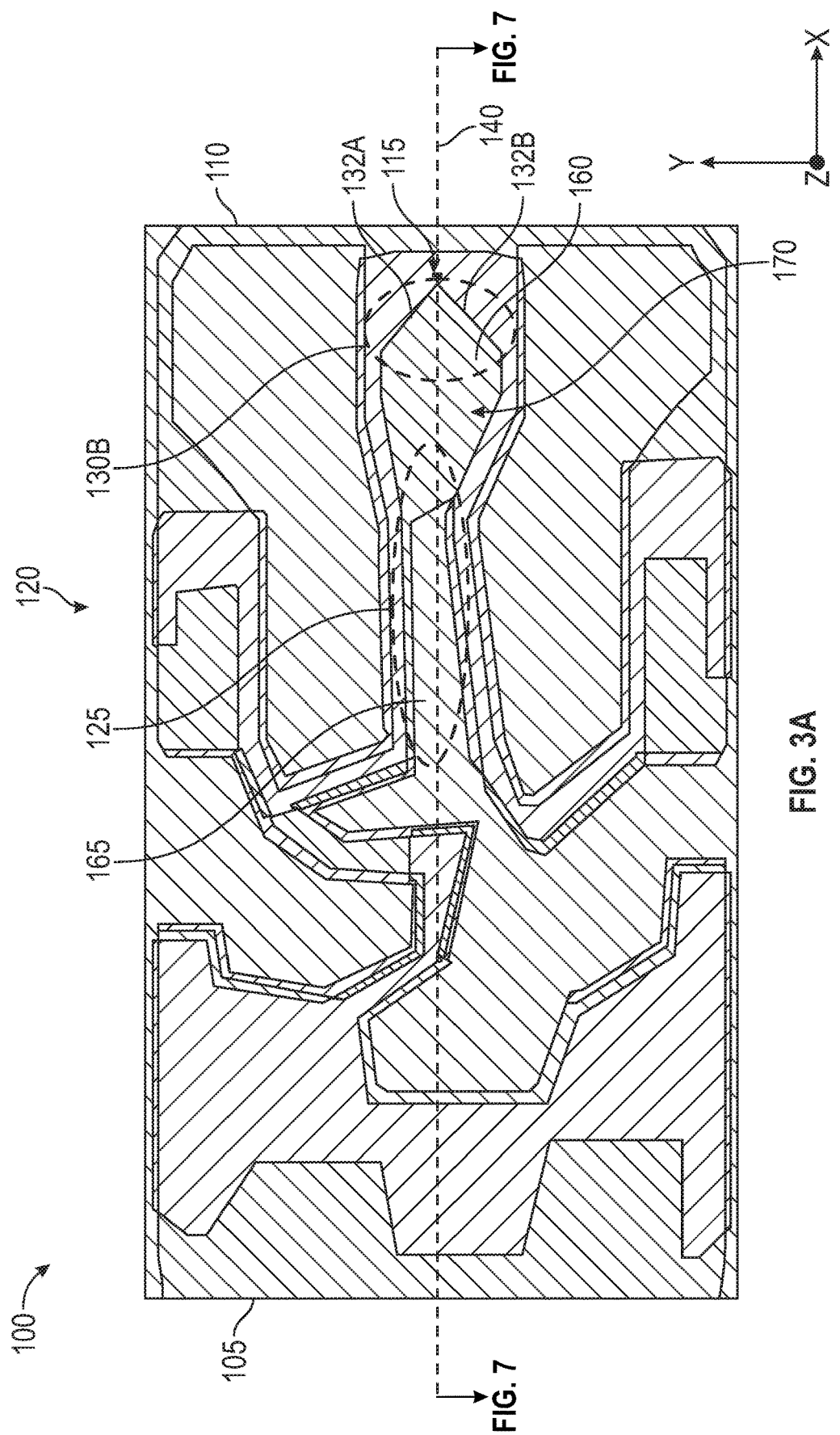

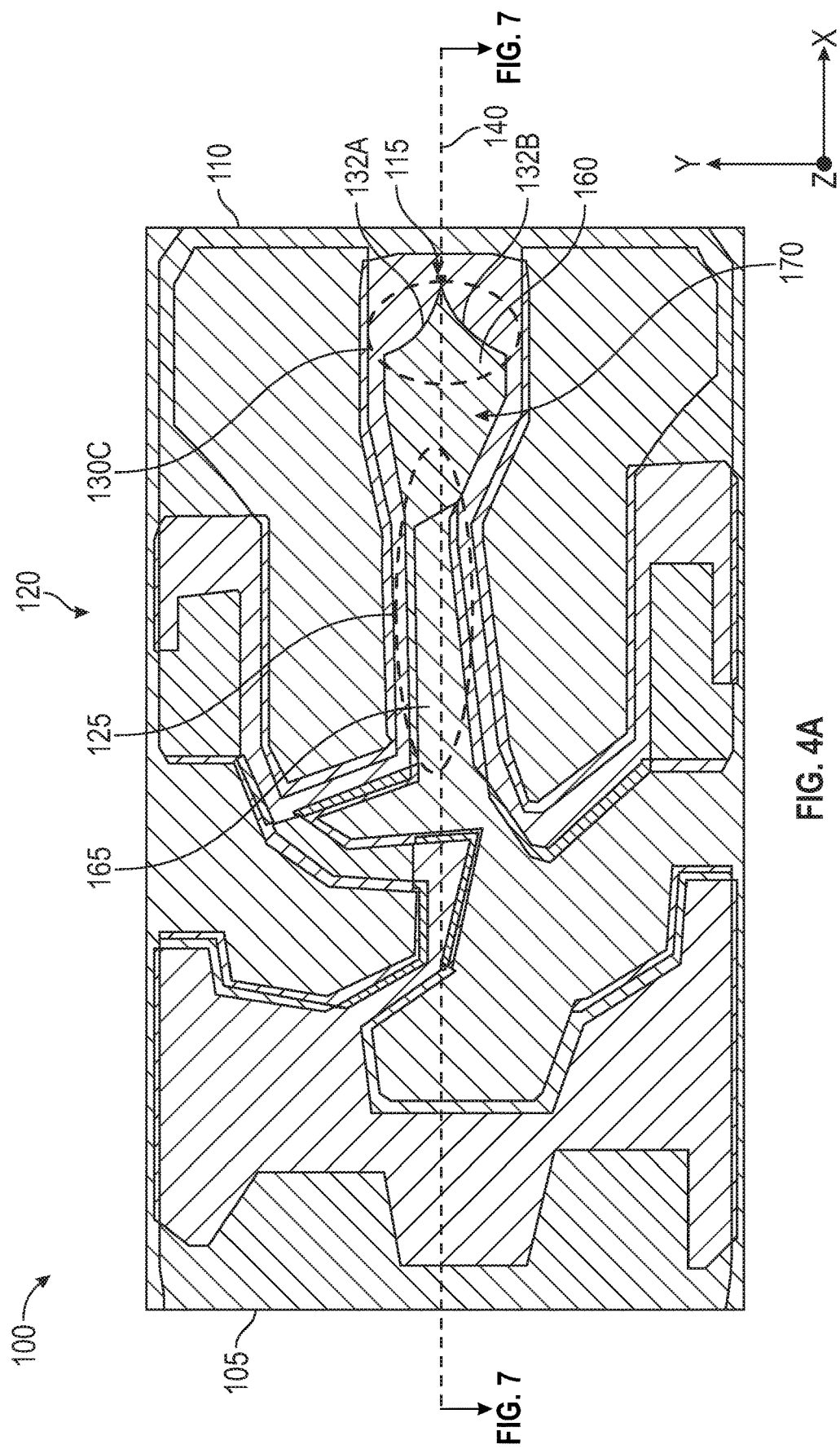

SLIDER GAS-BEARING SURFACE DESIGNS TO MITIGATE EFFECTS OF SMEAR IN HEAT-ASSISTED MAGNETIC RECORDING

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy ($K_u$) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. A NFT may have a generally triangular output end, such that an evanescent wave generated at a surface of the waveguide couples to surface plasmons excited on the surface of the NFT, and a strong optical near-field is generated at the apex of the triangular output end.

Because of its function, the NFT can reach high temperatures, which, if left uncorrected or continuing for too long a period of time, can cause HAMR drive failures.

Many data storage devices, such as hard disk drives, operate in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to ABS designs, however. For example, the intensive heating used in HAMR can cause desorption of organic gas phase contaminants and lubricant molecules on the media surface, and then accumulation of those materials at the NFT area. The material buildup, known as smear, has been found to form around the NFT. Smear accumulation can affect the reliability of the NFT and also can cause head-disk interface issues, such as touch down power change in the drive.

Therefore, there is a need in the art for solutions that mitigate the effects of smear from the write head and, in particular, from the NFT area of a HAMR write head.

SUMMARY

This summary provides a non-limiting, non-exhaustive summary of disclosed embodiments.

The present disclosure generally relates to slider ABS designs that increase the delivery of oxygen to the NFT of a HAMR write head. The slider ABS includes a funnel region near the NFT. During operation of the HAMR storage device, a center channel guides gas into the funnel region and compresses the gas along the way. The funnel region further compresses the gas and directs the gas to the NFT area, which leads to increased gas pressure near the NFT area. The gas includes some oxygen molecules, and increased gas pressure near the NFT area results in an increased number of oxygen molecules in that area. The material buildup that forms the smear typically includes materials such as carbon, silicon, and nitrogen, and the increased amount of oxygen causes the smear to oxidize, thereby leaving the write head with a reduced and/or eliminated smear and reducing its deleterious effect on the performance of the HAMR write head.

In some embodiments, a slider for a data storage device comprises a leading edge, a trailing edge, a NFT, and an ABS. The ABS comprises a channel configured to direct gas in a direction from the leading edge toward the trailing edge, and a funnel region connected to the channel, disposed between the channel and the NFT, and configured to receive gas from the channel, wherein in an ABS view of the slider, a width of the funnel region along a longitudinal axis passing through the NFT monotonically increases with distance from the NFT.

In some embodiments, in an ABS view of the slider, at least a portion of the funnel region has a linear v-shape or a curved v-shape.

In some embodiments, the funnel region comprises first and second side walls, which may intersect or which may have a back wall disposed between them.

In some embodiments, when the ABS is oriented upward, an interior of the channel is at a first level, and an interior of the funnel region is at a second level that is above the first level.

In some embodiments, when the ABS is oriented upward, a longitudinal profile of the ABS taken through the channel and the funnel region comprises a first segment within the channel, and a second segment within the funnel region. In some such embodiments, the first segment is below the second segment. In some such embodiments, one or both of the first and second segments are substantially horizontal. In some embodiments, the first and/or second segment is sloped or has a curve.

In some embodiments, a slider for a data storage device comprises a leading edge, a trailing edge, a NFT, and a gas-directing structure comprising a v-shaped funnel region configured to, in operation, increase a flow of oxygen molecules between the NFT and a media of the data storage device. In some such embodiments, at least one wall or surface of the v-shaped funnel region is linear or curved.

In some embodiments, the gas-directing structure further comprises a channel configured to direct gas into the v-shaped funnel region. In some such embodiments, the v-shaped funnel region comprises a first gas-bearing-surface level and the channel comprises a second gas-bearing-surface level, and, when the slider is disposed in the data storage device, a distance between the first gas-bearing-surface level and the media is less than a distance between the second gas-bearing-surface level and the media.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 3A is an ABS view of another exemplary slider in accordance with some embodiments.

FIG. 4A is an ABS view of another exemplary slider in accordance with some embodiments.

DETAILED DESCRIPTION

The following description is made for the purpose of illustrating the general principles of the present disclosure and is not meant to limit the inventive concepts claimed herein. Furthermore, particular features described herein can be used in combination with other described features in various possible combinations and permutations.

Figure 1:
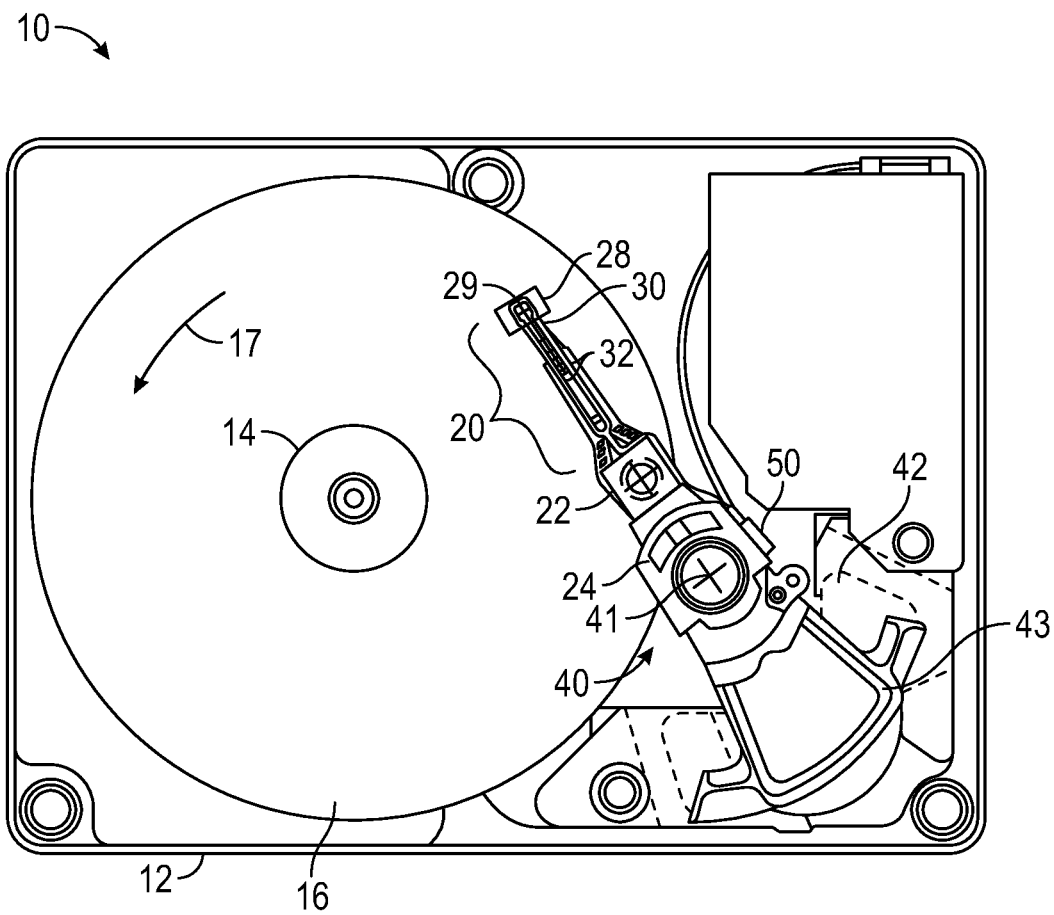
FIG. 1 illustrates a data storage device in accordance with some embodiments.

FIG. 1 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 100. The slider 100 may be, for example, one of the embodiments disclosed herein. A magnetic recording read/write head 29 is located at the end or trailing surface of slider 100. The flexure 30 enables the slider 100 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags gas (which may be air, helium, etc.) under the slider 100 and along the air-bearing surface (ABS) of the slider 100 in a direction approximately parallel to the tangential velocity of the disk 16. It is to be understood that the term "air-bearing surface (ABS)" is used herein to refer to the gas-bearing surface of a slider, regardless of whether the gas within the drive is air or another gas (e.g., helium) or a mixture of gases. As the air or gas passes under the ABS, compression of the air or gas along the air flow path causes the pressure between the disk 16 and the ABS to increase, which creates a hydrodynamic lifting force that counteracts the tendency of the at least one load beam assembly 20 to push the slider 100 toward the disk 16. The slider 100 thus flies above the disk 16 but in close proximity to the surface of the disk 16.

The slider 100 supports a read/write head 29, which in at least some of the embodiments disclosed herein is a HAMR head that includes an inductive write head, the NFT, and an optical waveguide. (As stated previously, the term "HAMR" as used herein refers to all variants of thermally-assisted recording, including TAR, TAMR, EAMR, and HAMR.) A semiconductor laser with a wavelength of 780 to 980 nm may be used as the HAMR light source. The laser may be supported on the top of the slider 100, or it may be located on the flexure 30 and coupled to the slider 100 by an optical channel. As the disk 16 rotates in the direction of the arrow 17, the movement of the actuator assembly 40 allows the HAMR head on the slider 100 to access different data tracks on the disk 16. The slider 100 is typically formed of a composite material, such as a composite of alumina/titanium-carbide ($Al_2O_3$/TiC). FIG. 1 illustrates only one disk 16 surface with associated slider 100 and read/write head 29, but there may be multiple disks 16 stacked on a hub that is rotated by a spindle motor, with a separate slider 100 and read/write head 29 associated with each surface of each disk 16.

In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 100 passes over a track on the disk 16, the read/write head 29 detects changes in resistance due to magnetic field variations recorded on the disk 16, which represent the recorded bits.

In a HAMR disk drive, excessive heating of the NFT can cause performance degradation and eventually failure of the drive. One possible cause of failure due to excessive heating may be due to adsorption of carbonaceous material on the slider overcoat near the NFT tip. Hydrocarbon molecules from the disk overcoat and lubricant can become mobile at elevated temperatures and adsorb on the slider ABS. Over time, these molecules can form a "smear" that absorbs power from the laser source and causes the NFT, which normally operates at very high temperatures, to become even hotter than usual. Smear can block light from the laser source, thereby reducing the amount by which the media is heated for the write process. Furthermore, hot smear can wear out the overcoat that protects the NFT tip. Once the overcoat has been worn out, the heat is transferred from the smear to the NFT, which can result in diffusion of the NFT metal until the NFT tip rounds and recording degrades, eventually possibly leading to failure.

Smear can contain materials such as carbon, silicon, and/or nitrogen. Consequently, if the smear is hot enough while in the presence of enough oxygen, it can oxidize and produce glassy products (e.g., $SiO_2$, NO, etc.) and/or carbon-based gases (e.g., CO, $CO_2$, etc.), or combinations thereof. The produced gases dissipate, and the HAMR head's laser light can typically penetrate the resulting glassy products (if present) without heating them, which provides the desired heating of the media while preventing excessive heating of the NFT, which can substantially improve the lifetime of the NFT.

Smear is common in sealed-helium hard drives, which have far fewer oxygen molecules than standard-atmosphere hard drives. As a result, when sliders with prior-art ABS designs are used in sealed-helium hard drives, the quantity of oxygen molecules in the vicinity of the NFT and smear may be insufficient to promote oxidation of the smear. Although the oxygen content of the hard drive could be increased, doing so would necessarily reduce the amount of helium in the drive, which in turn could reduce or eliminate various benefits of the sealed-helium drive, such as lower power consumption. Consequently, there is a need for solutions that increase the amount of oxygen in the vicinity of the NFT to promote oxidation of the smear without requiring a dramatic increase in the overall oxygen content in hard drives such as sealed-helium drives.

The ABS designs disclosed herein aim to concentrate oxygen near the NFT to promote oxidation of smear and reduce the deleterious effects of smear on performance and NFT lifetime.

Figure 2A:
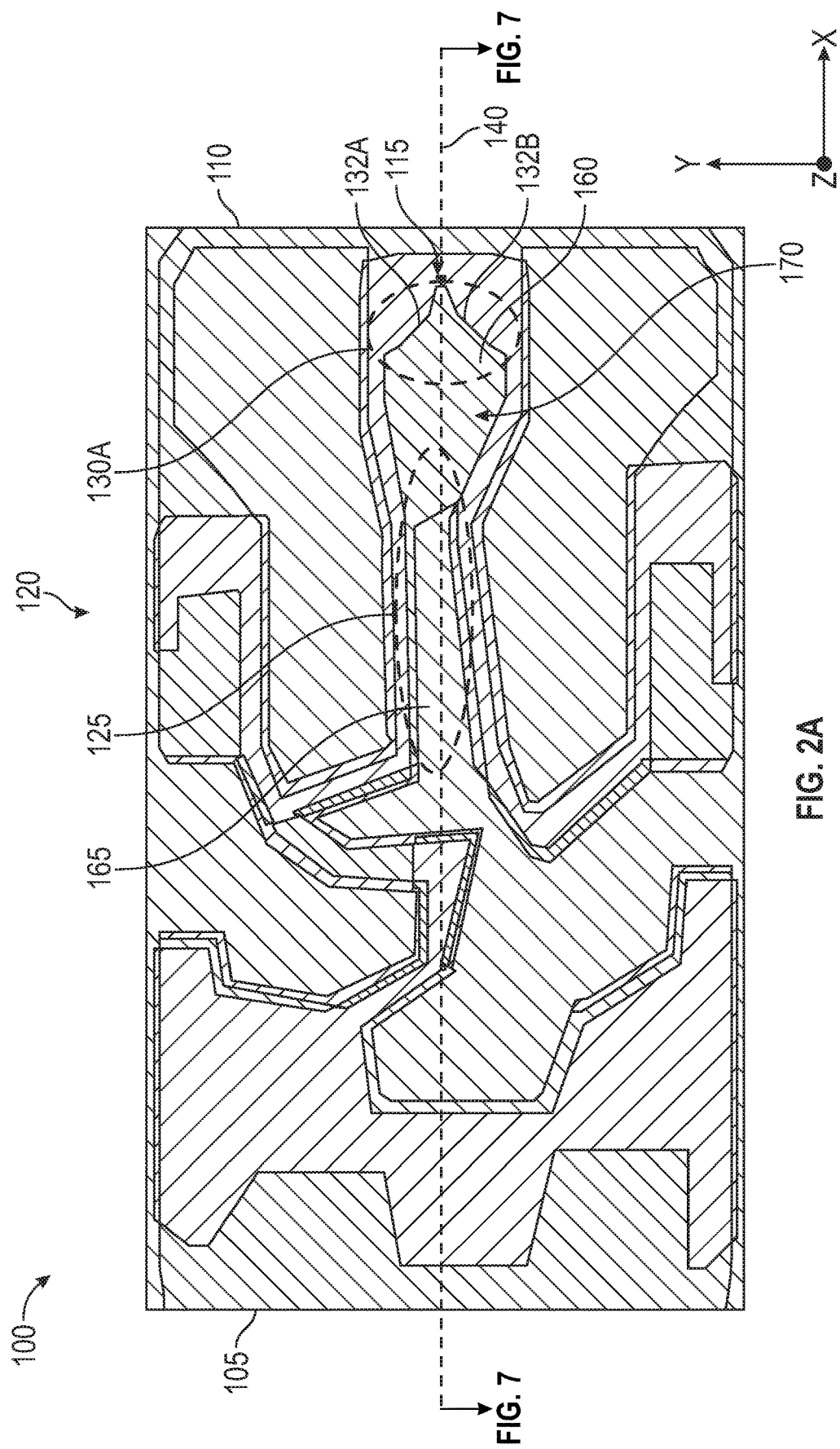
FIG. 2A is an ABS view of an exemplary slider in accordance with some embodiments.

FIG. 2A is an ABS view of an exemplary slider 100 for a data storage device, such as the hard disk drive 10, in accordance with some embodiments. The slider 100 has a leading edge 105, a trailing edge 110, and an ABS 120. As shown by the axes of FIG. 2A, the ABS 120 lies in an x-y plane. A NFT 115 of the write head is disposed near the trailing edge 110 on a pad of the ABS 120. The NFT 115 intersects a longitudinal axis 140, which extends between the leading edge 105 and the trailing edge 110. In the exemplary embodiment of FIG. 2A, the longitudinal axis 140 is substantially perpendicular to the leading edge 105 and the trailing edge 110 (i.e., the longitudinal axis extends in the x-direction designated by the axes of FIG. 2A).

Figure 2B:
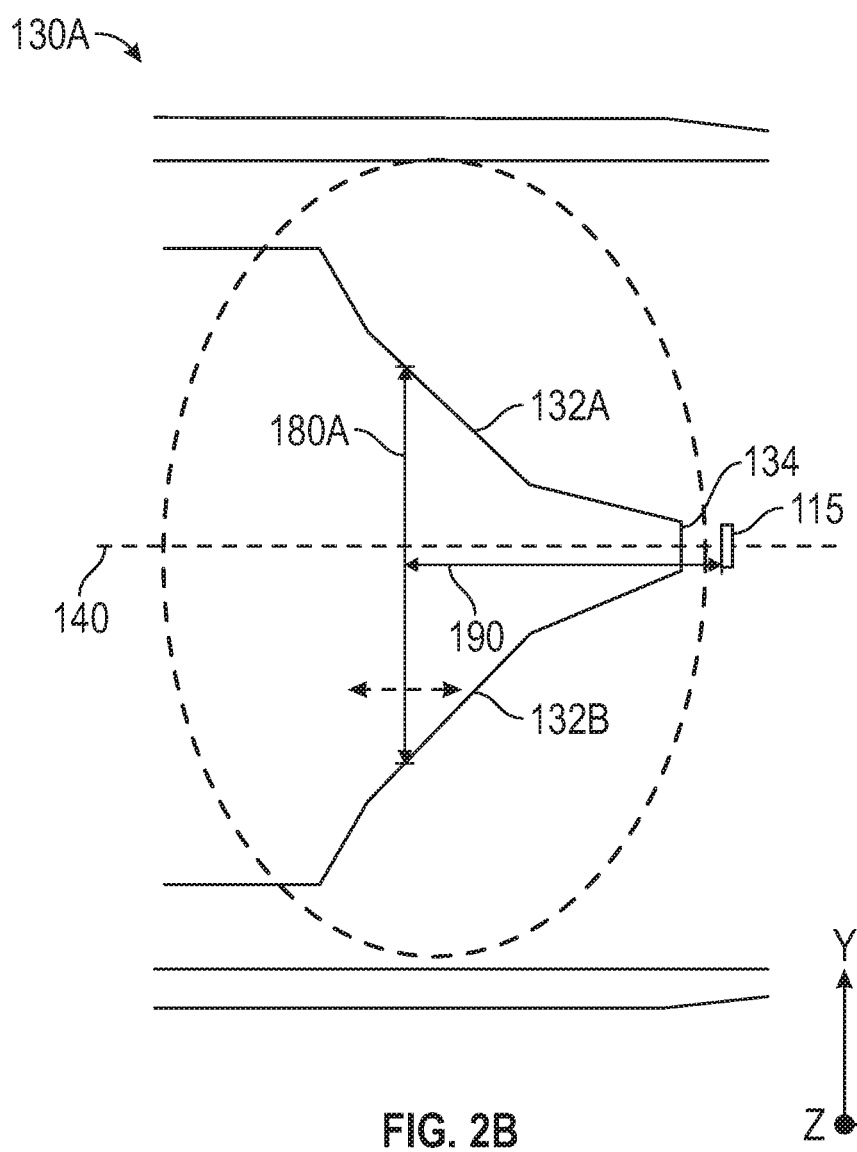
FIG. 2B is a closer view of the exemplary funnel region shown in FIG. 2A.

The ABS 120 includes a channel 125 and a funnel region 130A. In the exemplary slider 100 of FIG. 2A, the interior of the channel 125 is at a level 165 (in the z-direction), and the interior of the funnel region is at a level 160 (also in the z-direction). The levels 160, 165 may be the same, or, as shown in FIGS. 2A and 2B, they may be different. For example, when the slider is oriented upward, the level 160 may be above the level 165, such that the level 160 provides a step up from the level 165. Stated another way, the depth of the interior of the channel 125 may be greater than the depth of the interior of the funnel region 130A relative to the topmost level of the slider 100. When the slider 100 is installed in a data storage device, such as a disk drive 10, the level 160 may be closer than the level 165 to the media. Exemplary characteristics of the levels 160, 165 are discussed below in the context of FIGS. 7A-7F.

The channel 125 is designed to direct gas in the general direction from the leading edge 105 to the trailing edge 110 as the slider 100 flies over the recording media. In some embodiments, the channel 125 directs gas substantially in the direction of the longitudinal axis 140 of the slider 100 (i.e., in the x-direction). The funnel region 130A resides between the channel 125 and the NFT 115. As shown in FIG. 2A, the ABS 120 may include a transition region 170 between the channel 125 and the funnel region 130A.

FIG. 2B is a closer view of the exemplary funnel region 130A in the ABS view. The physical characteristics of the funnel region 130A (e.g., size, shape, etc.) are selected so that, in operation, when the ABS 120 faces the surface of the media (e.g., the disk 16), the funnel region 130A receives gas directed to it by the channel 125 (potentially via a transition region 170) and directs the gas at an increased pressure between the NFT 115 and the media surface (i.e., the funnel region 130A directs gas toward and under the NFT 115 when the data storage device is in operation). As a result, the quantity of oxygen molecules in the vicinity of the NFT 115 increases, thereby allowing the smear to oxidize more readily than when the ABS 120 does not include the funnel region 130A.

The funnel region 130A is characterized by a width 180A measured perpendicular to the longitudinal axis 140 (i.e., the width 180A is measured in the y-direction). The width 180A varies with the distance 190 from the NFT 115 along the longitudinal axis 140 (i.e., in the x-direction with the axes oriented as shown in FIG. 2B). As shown in FIGS. 2A and 2B, the width 180A monotonically increases with increasing distance 190 from the NFT 115 (i.e., as the point at which the width 180A is measured proceeds in the −x-direction with the axes shown in FIG. 2B). Stated another way, as the distance 190 from the NFT 115 increases along the longitudinal axis 140 (in the −x-direction), the width 180A does not decrease.

As shown in FIGS. 2A and 2B, in the ABS view of the slider 100, the exemplary funnel region 130A is generally v-shaped, which helps to increase the pressure of and direct gas toward the NFT 115, thereby concentrating oxygen molecules near the NFT 115 and promoting oxidation of smear (if present). The funnel region 130A has two side walls 132A, 132B and a back wall 134 disposed between the side walls 132A, 132B near the NFT 115. In the exemplary funnel region 130A, each of the side walls 132A, 132B comprises linear segments in the ABS view of FIG. 2B. Thus, it is said to have a linear v-shape, even though the side walls 132A, 132B are piecewise linear. The walls 132A, 132B, 134 may have any suitable characteristics in the z-direction. For example, it may be desirable or convenient to manufacture the slider 100 with substantially vertical walls 132A, 132B, 134 (e.g., by milling, etching, lapping, etc.). The walls 132A, 132B, 134 may be smooth, or they may have protrusions or crevices, whether by design or as a result of the slider 100 fabrication process. Like the other features of the slider 100, the walls 132A, 132B, 134 may have any physical characteristics and features that result in the funnel region 130A being able to provide enough oxygen in the vicinity of the NFT 115 to mitigate the effects of smear. For example, the walls 132A, 132B, 134 may be substantially vertical (e.g., aligned with the z-axis), sloped, curved, etc.

FIG. 3A is an ABS view of another exemplary slider 100 for a data storage device, such as the hard disk drive 10, in accordance with some embodiments. Many of the physical features of the slider 100 of FIG. 3A were described in the discussion of FIGS. 2A and 2B, and those descriptions are not repeated here.

Figure 3B:
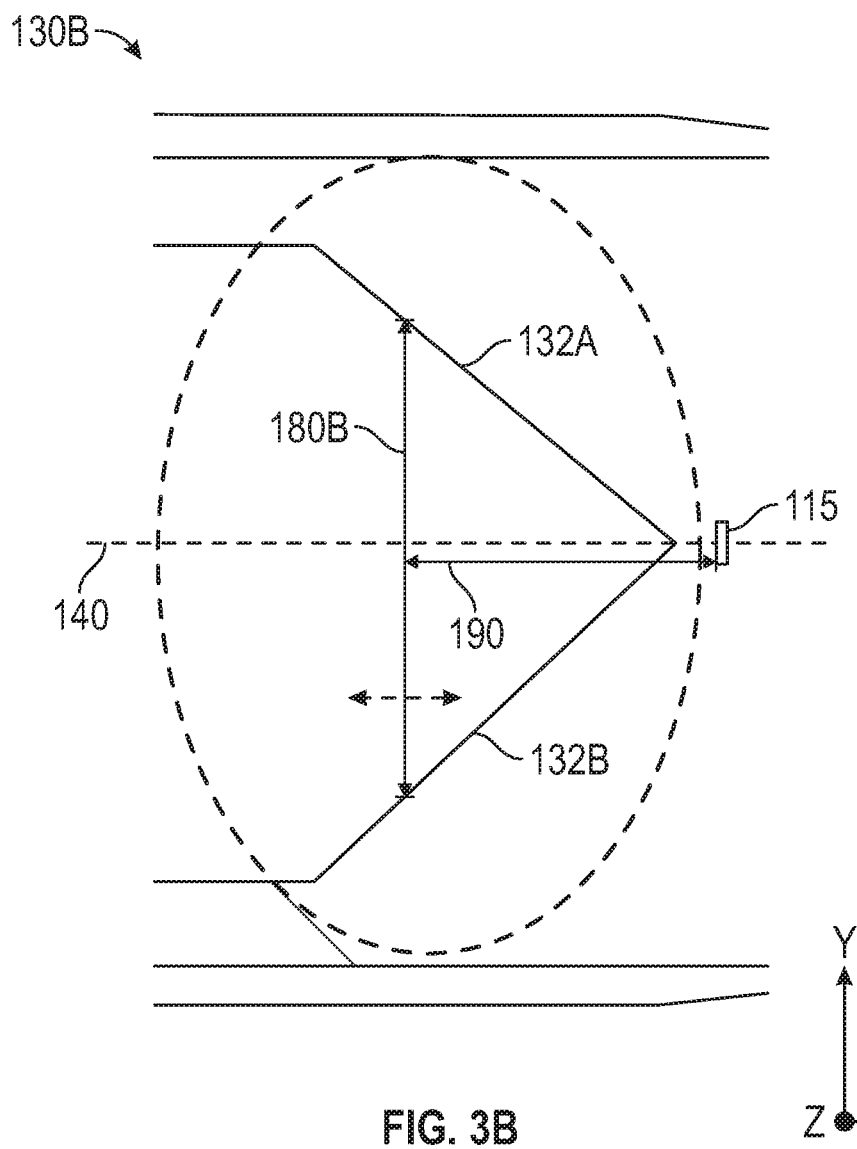
FIG. 3B is a closer view of the exemplary funnel region shown in FIG. 3A.

The ABS 120 in FIG. 3A includes a channel 125 and a funnel region 130B. FIG. 3B is a closer view of the exemplary funnel region 130B in the ABS view. The physical characteristics of the funnel region 130B (e.g., size, shape, etc.) are selected so that, in operation, when the ABS 120 faces the surface of the media (e.g., the disk 16), the funnel region 130B receives gas directed to it by the channel 125 (potentially via a transition region 170) and directs the gas at an increased pressure between the NFT 115 and the media surface (i.e., the funnel region 130B directs gas toward and under the NFT 115 when the data storage device is in operation). As a result, the quantity of oxygen molecules in the vicinity of the NFT 115 increases, thereby allowing the smear to oxidize more readily than without the funnel region 130B.

The funnel region 130B is characterized by a width 180B measured perpendicular to the longitudinal axis 140 (i.e., in the y-direction). The width 180B varies with the distance 190 from the NFT 115 along the longitudinal axis 140 (i.e., in the x-direction with the axes oriented as shown in FIG. 3B). As shown in FIGS. 3A and 3B, the width 180B monotonically increases with increasing distance 190 from the NFT 115 (i.e., as the point at which the width 180B is measured proceeds in the −x-direction with the axes shown in FIG. 3B). Stated another way, as the distance 190 from the NFT 115 increases along the longitudinal axis 140 (in the −x-direction), the width 180B does not decrease.

As shown in FIGS. 3A and 3B, in the ABS view of the slider 100, the exemplary funnel region 130B is generally v-shaped, which helps to increase the pressure of and direct gas toward the NFT 115. The funnel region 130B has two side walls 132A, 132B, which intersect near the NFT 115. Unlike the funnel region 130A in FIGS. 2A and 2B, the funnel region 130B does not include a back wall 134. In the exemplary funnel region 130B, each of the side walls 132A, 132B is linear in the ABS view of FIG. 3B. Thus, it is said to have a linear v-shape. As explained in the discussion of FIG. 2B, the walls 132A, 132B may have any suitable characteristics in the z-direction.

FIG. 4A is an ABS view of another exemplary slider 100 for a data storage device, such as the hard disk drive 10, in accordance with some embodiments. Many of the physical features of the slider 100 of FIG. 4A were described in the discussion of FIGS. 2A and 2B, and those descriptions are not repeated here.

Figure 4B:
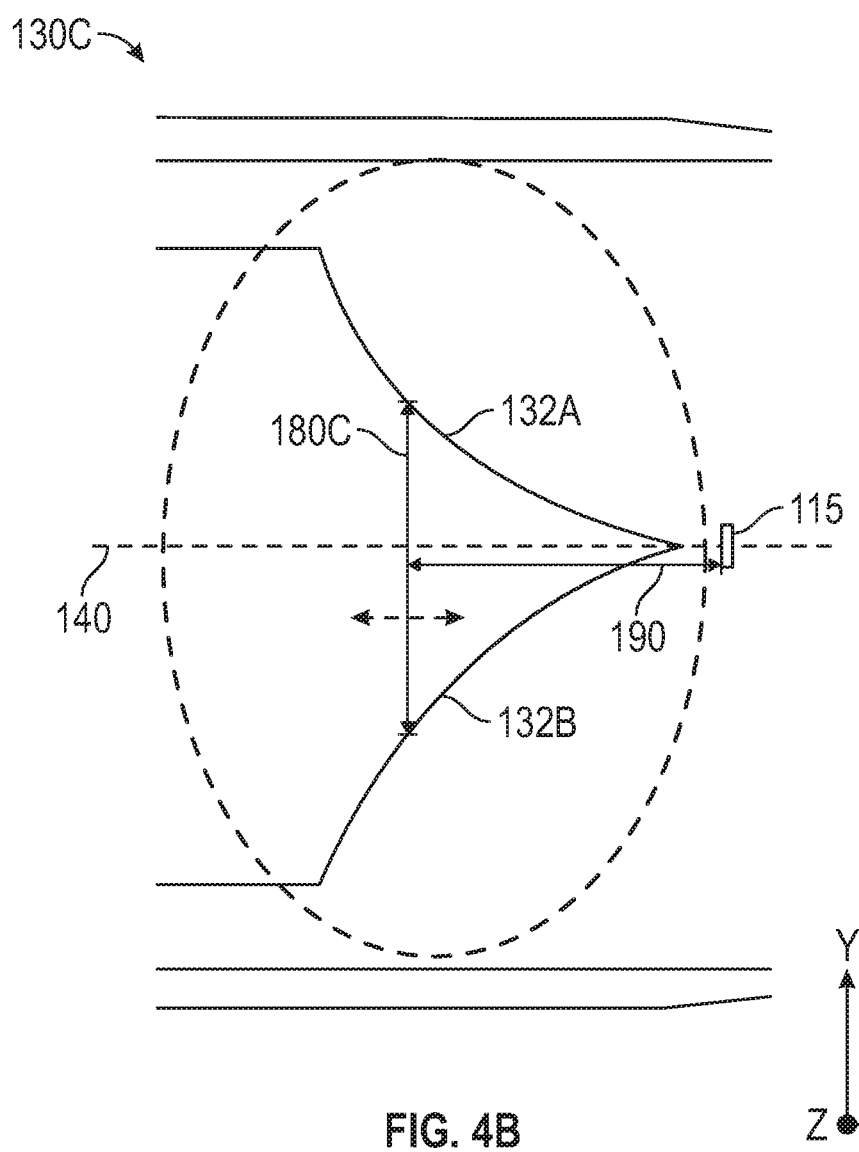
FIG. 4B is a closer view of the exemplary funnel region shown in FIG. 4A.

The ABS 120 in FIG. 4A includes a channel 125 and a funnel region 130C. FIG. 4B is a closer view of the exemplary funnel region 130C in the ABS view. The physical characteristics of the funnel region 130C (e.g., size, shape, etc.) are selected so that, in operation, when the ABS 120 faces the surface of the media (e.g., the disk 16), the funnel region 130C receives gas directed to it by the channel 125 (potentially via a transition region 170) and directs the gas at an increased pressure between the NFT 115 and the media surface (i.e., the funnel region 130C directs gas toward and under the NFT 115 when the data storage device is in operation). As a result, the quantity of oxygen molecules in the vicinity of the NFT 115 increases, thereby allowing the smear to oxidize more readily than without the funnel region 130C.

The funnel region 130C is characterized by a width 180C measured perpendicular to the longitudinal axis 140 (i.e., in the y-direction). The width 180C varies with the distance 190 from the NFT 115 along the longitudinal axis 140 (i.e., in the x-direction with the axes oriented as shown in FIG. 4B). As shown in FIGS. 4A and 4B, the width 180C monotonically increases with increasing distance 190 from the NFT 115 (i.e., as the point at which the width 180C is measured proceeds in the −x-direction with the axes shown in FIG. 4B). Stated another way, as the distance 190 from the NFT 115 increases along the longitudinal axis 140 (in the −x-direction), the width 180C does not decrease.

As shown in FIGS. 4A and 4B, in the ABS view of the slider 100, the exemplary funnel region 130C is generally v-shaped, which helps to increase the pressure of and direct gas toward the NFT 115. The funnel region 130C has two side walls 132A, 132B, which intersect near the NFT 115. In the exemplary funnel region 130C, each of the side walls 132A, 132B includes an arced segment in the ABS view of FIG. 4B. Thus, it is said to have a curved v-shape. As explained in the discussion of FIG. 2B, the walls 132A, 132B may have any suitable characteristics in the z-direction.

Figure 5A:
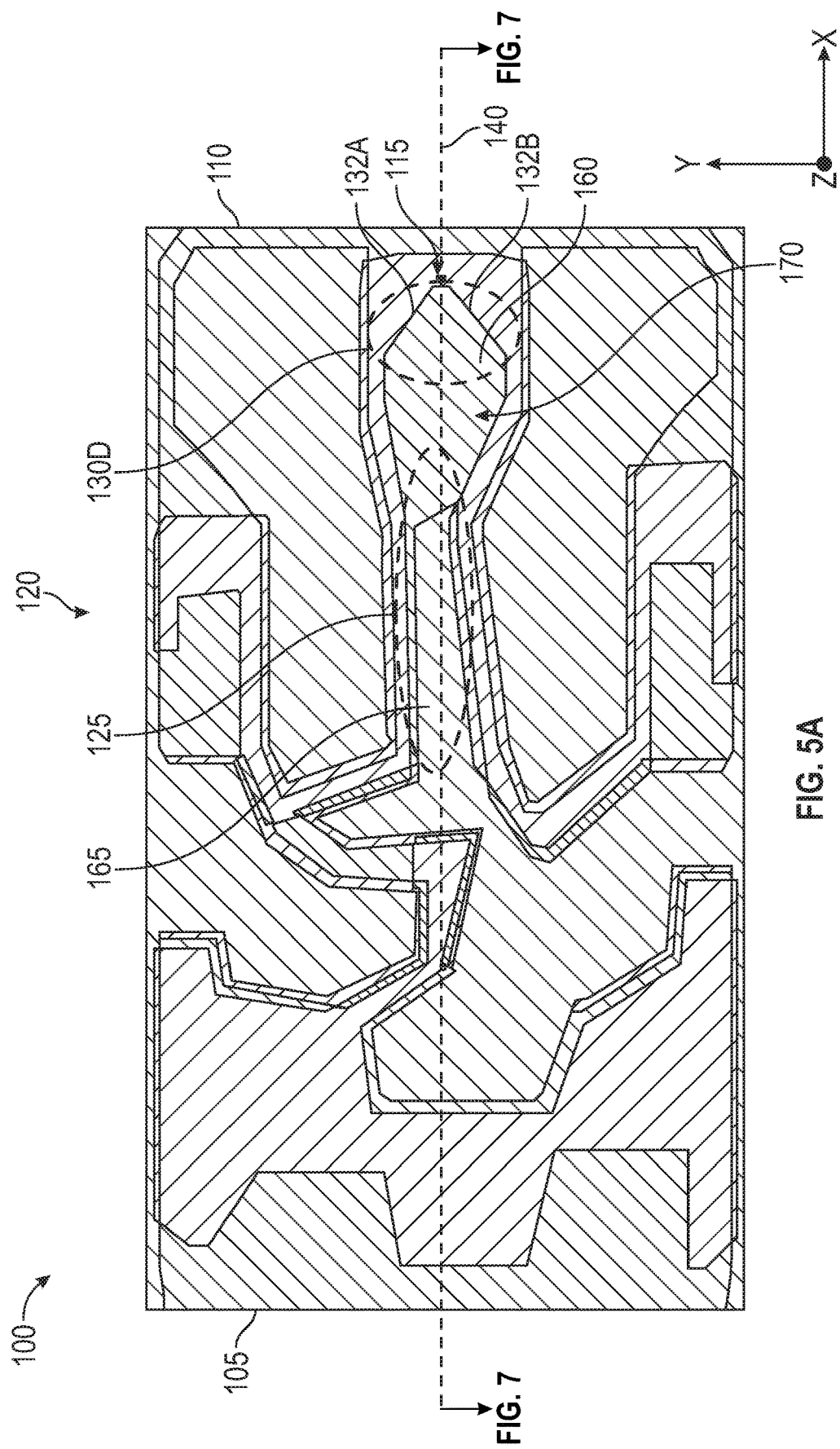
FIG. 5A is an ABS view of another exemplary slider in accordance with some embodiments.

FIG. 5A is an ABS view of another exemplary slider 100 for a data storage device, such as the hard disk drive 10, in accordance with some embodiments. Many of the physical features of the slider 100 of FIG. 5A were described in the discussion of FIGS. 2A and 2B, and those descriptions are not repeated here.

Figure 5B:
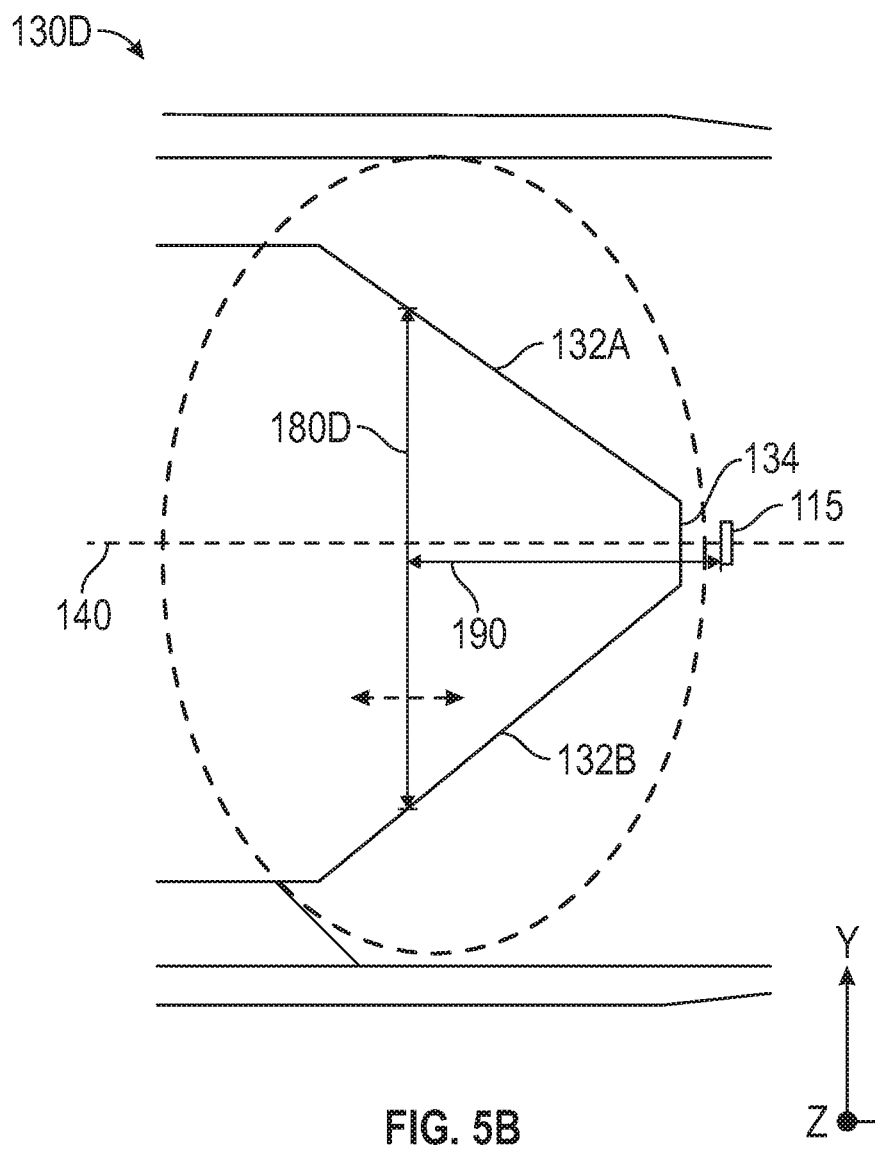
FIG. 5B is a closer view of the exemplary funnel region shown in FIG. 5A.

The ABS 120 in FIG. 5A includes a channel 125 and a funnel region 130D. FIG. 5B is a closer view of the exemplary funnel region 130D in the ABS view. The physical characteristics of the funnel region 130D (e.g., size, shape, etc.) are selected so that, in operation, when the ABS 120 faces the surface of the media (e.g., the disk 16), the funnel region 130D receives gas directed to it by the channel 125 (potentially via a transition region 170) and directs the gas at an increased pressure between the NFT 115 and the media surface (i.e., the funnel region 130D directs gas toward and under the NFT 115 when the data storage device is in operation). As a result, the quantity of oxygen molecules in the vicinity of the NFT 115 increases, thereby allowing the smear to oxidize more readily than without the funnel region 130D.

The funnel region 130D is characterized by a width 180D measured perpendicular to the longitudinal axis 140 (i.e., in the y-direction). The width 180D varies with the distance 190 from the NFT 115 along the longitudinal axis 140 (i.e., in the x-direction with the axes oriented as shown in FIG. 5B). As shown in FIGS. 5A and 5B, the width 180D monotonically increases with increasing distance 190 from the NFT 115 (i.e., as the point at which the width 180D is measured proceeds in the −x-direction with the axes shown in FIG. 5B). Stated another way, as the distance 190 from the NFT 115 increases along the longitudinal axis 140 (in the −x-direction), the width 180D does not decrease.

As shown in FIGS. 5A and 5B, in the ABS view of the slider 100, the exemplary funnel region 130D is generally v-shaped, which helps to increase the pressure of and direct gas toward the NFT 115. The funnel region 130D has two side walls 132A, 132B and a back wall 134 disposed between the side walls 132A, 132B near the NFT 115. In the exemplary funnel region 130D, each of the side walls 132A, 132B includes a linear segment in the ABS view of FIG. 5B. Thus, it is said to have a linear v-shape even though the back wall 134 is disposed between the two side walls 132A, 132B. As explained in the discussion of FIG. 2B, the side walls 132A, 132B and the back wall 134 may have any suitable characteristics in the z-direction.

Figure 6A:
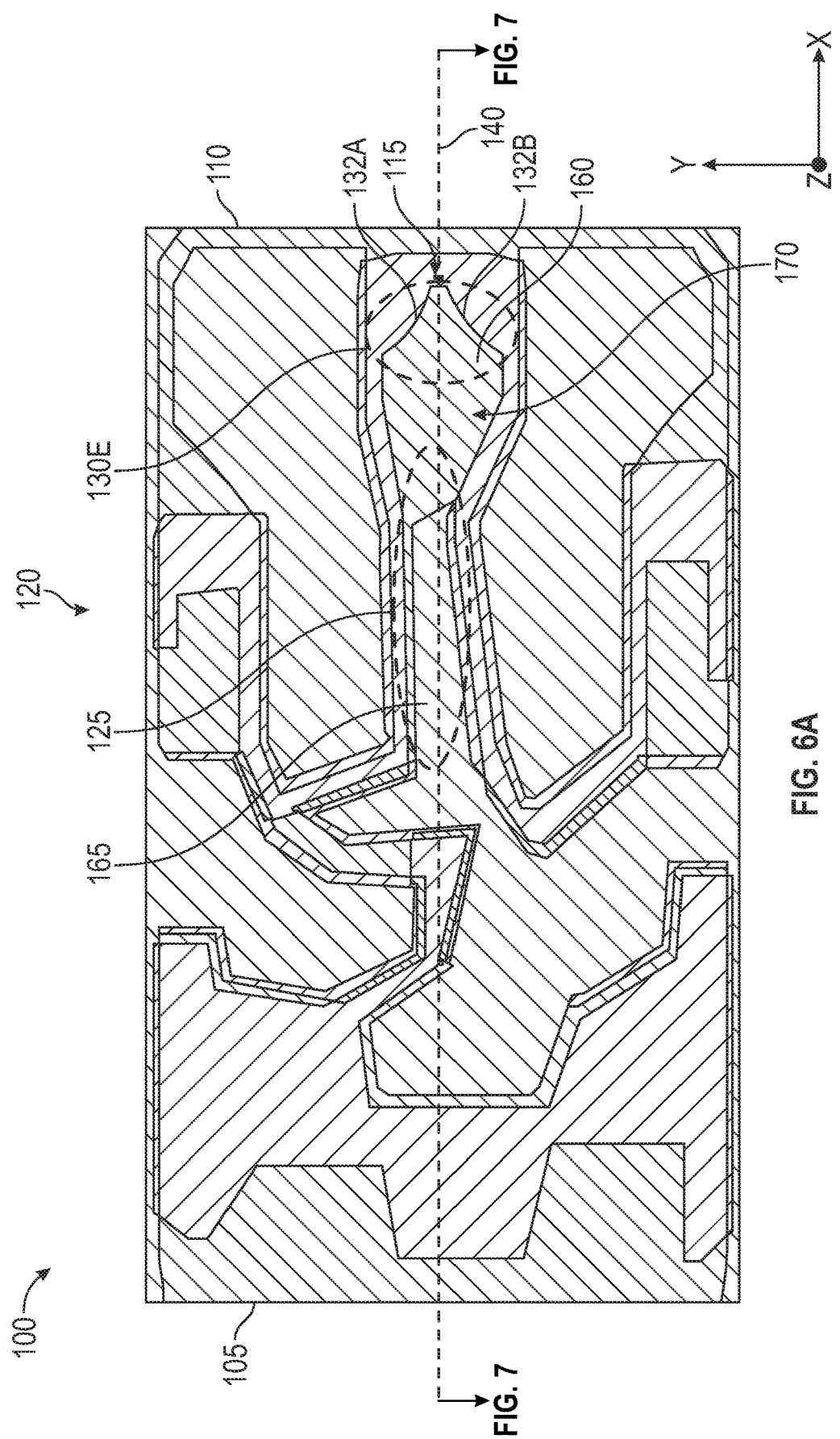
FIG. 6A is an ABS view of another exemplary slider in accordance with some embodiments.

FIG. 6A is an ABS view of another exemplary slider 100 for a data storage device, such as the hard disk drive 10, in accordance with some embodiments. Many of the physical features of the slider 100 of FIG. 6A were described in the discussion of FIGS. 2A and 2B, and those descriptions are not repeated here.

Figure 6B:
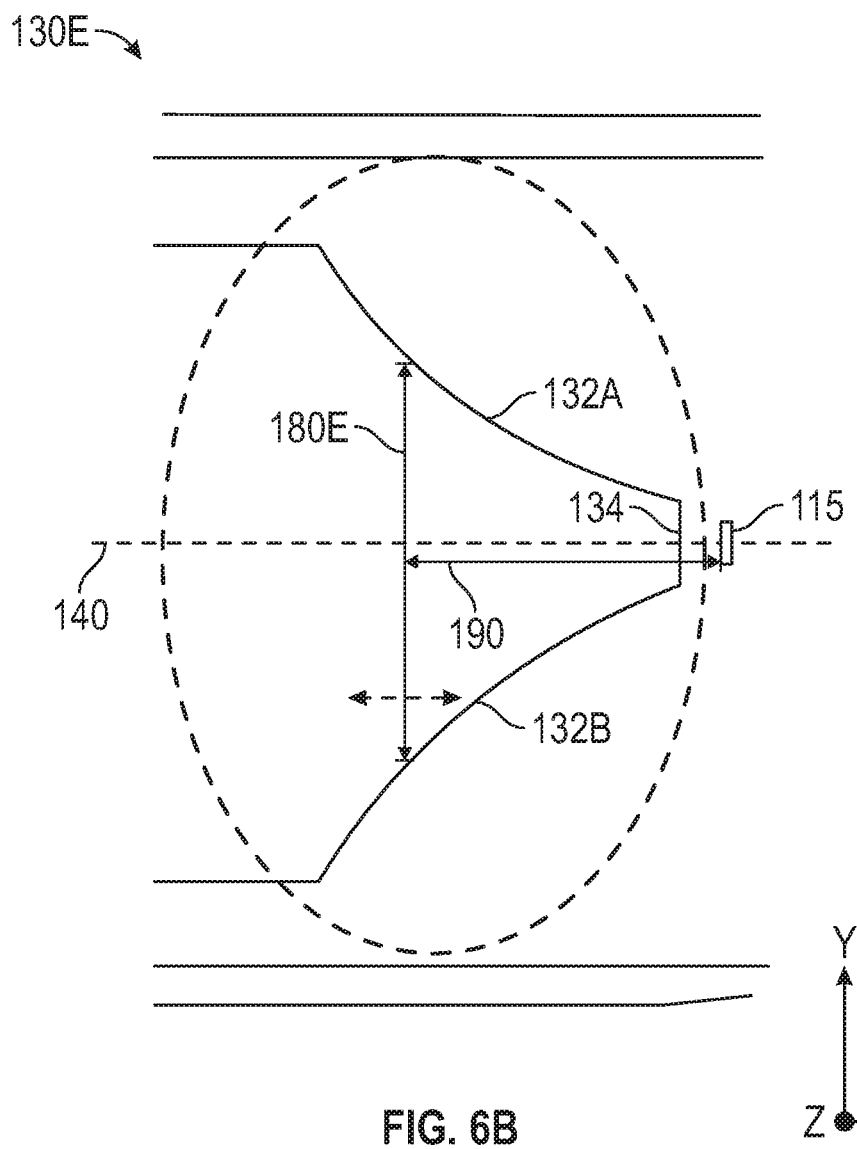
FIG. 6B is a closer view of the exemplary funnel region shown in FIG. 6A.

The ABS 120 in FIG. 6A includes a channel 125 and a funnel region 130E. FIG. 6B is a closer view of the exemplary funnel region 130E in the ABS view. The physical characteristics of the funnel region 130E (e.g., size, shape, etc.) are selected so that, in operation, when the ABS 120 faces the surface of the media (e.g., the disk 16), the funnel region 130E receives gas directed to it by the channel 125 (potentially via a transition region 170) and directs the gas at an increased pressure between the NFT 115 and the media surface (i.e., the funnel region 130E directs gas toward and under the NFT 115 when the data storage device is in operation). As a result, the quantity of oxygen molecules in the vicinity of the NFT 115 increases, thereby allowing the smear to oxidize more readily than without the funnel region 130E.

The funnel region 130E is characterized by a width 180E measured perpendicular to the longitudinal axis 140 (i.e., in the y-direction). The width 180E varies with the distance 190 from the NFT 115 along the longitudinal axis 140 (i.e., in the x-direction with the axes oriented as shown in FIG. 6B). As shown in FIGS. 6A and 6B, the width 180E monotonically increases with increasing distance 190 from the NFT 115 (i.e., as the point at which the width 180E is measured proceeds in the −x-direction with the axes shown in FIG. 6B). Stated another way, as the distance 190 from the NFT 115 increases along the longitudinal axis 140 (in the −x-direction), the width 180E does not decrease.

As shown in FIGS. 6A and 6B, in the ABS view of the slider 100, the exemplary funnel region 130E is generally v-shaped, which helps to increase the pressure of and direct gas toward the NFT 115. The funnel region 130E has two side walls 132A, 132B and a back wall 134 disposed between the side walls 132A, 132B near the NFT 115. In the exemplary funnel region 130E, each of the side walls 132A, 132B includes an arced segment in the ABS view of FIG. 6B. Thus, it is said to have a curved v-shape even though the back wall 134 is disposed between the two side walls 132A, 132B. As explained in the discussion of FIG. 2B, the side walls 132A, 132B and the back wall 134 may have any suitable characteristics in the z-direction.

As explained above, each of the exemplary embodiments illustrated in FIGS. 2A, 2B, 3A, 3B, 4A, 4B, 5A, 5B, 6A, and 6B has a gas-directing structure that includes a channel 125 and a v-shaped funnel region 130. Some embodiments include linear side walls 132A, 132B, and other embodiments include curved side walls 132A, 132B. Some embodiments include a back wall 134, and other embodiments do not include a back wall 134. The channel 125 is configured to direct gas into the v-shaped funnel region 130. The v-shaped funnel region 130 is configured to increase the flow of oxygen molecules between the NFT 115 and the media of the data storage device when the slider 100 is installed and operates in a data storage device. The channel 125 and the v-shaped funnel region 130 can have any suitable characteristics. For example, the v-shaped funnel region 130 may have a gas-bearing surface level 160, and the channel 125 may have a gas-bearing surface level 165 at a different distance from the media when the slider 100 is installed in a data storage device (e.g., the gas-bearing surface level 160 may be closer than the gas-bearing surface level 165 to the surface of the media).

As explained above, the level 160 of the funnel region 130 and the level 165 of the channel 125 may have various characteristics and relationships. FIGS. 7A through 7F illustrate portions of several exemplary longitudinal profiles 150 of the slider 100 showing the channel 125 and the funnel region 130 (e.g., which may be one of the exemplary funnel regions 130A, 130B, 130C, 130D, 130E, or another funnel region 130). As used herein, a "longitudinal profile" is the variation in the ABS 120 of a slice of the slider 100 taken along the longitudinal axis 140. Thus, with reference to the axes shown in FIGS. 2A-6B, the longitudinal profile lies in an x-z plane. It is to be appreciated that the longitudinal profiles 150 illustrated in FIGS. 7A-7F are equally applicable to all of the sliders 100 illustrated in FIGS. 2A, 3A, 4A, 5A, and 6A, and therefore the reference character 130 is used without any additional designator (e.g., A, B, etc.) to identify the funnel region 130.

Figure 7A:
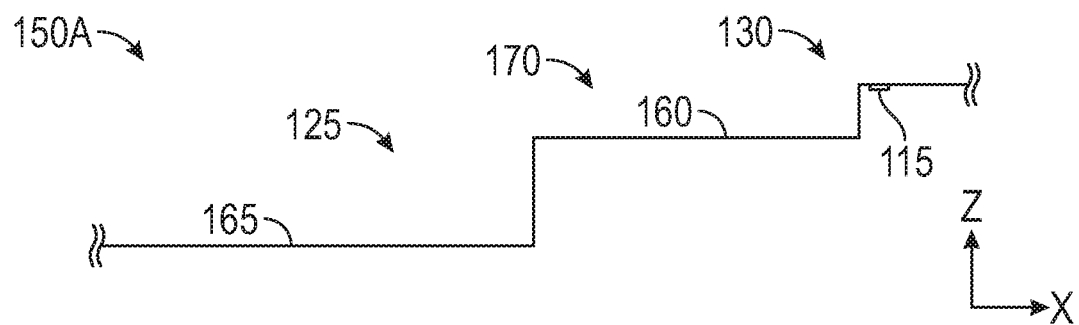
FIGS. 7A through 7F illustrate several exemplary longitudinal profiles of a slider in accordance with some embodiments.

FIG. 7A illustrates a portion of an exemplary longitudinal profile 150A in accordance with some embodiments. The channel 125 is at the level 165, and the transition region 170 and funnel region 130 are at a level 160. In the embodiment of FIG. 7A, there is no abrupt transition, in the x-z plane, from the transition region 170 to the funnel region 130. In the embodiment of FIG. 7A, the levels 160 and 165 are smooth, flat, and horizontal (i.e., they do not change in the x-direction). The longitudinal profile 150A may be desirable for its ease of manufacture. For example, a slider 100 having the longitudinal profile 150A shown in FIG. 7A may be fabricated using conventional masking and etching processes. The level 160 may be created in a first etching process, and the level 165 may be created through multiple etching processes, as is known in the art.

Figure 7B:
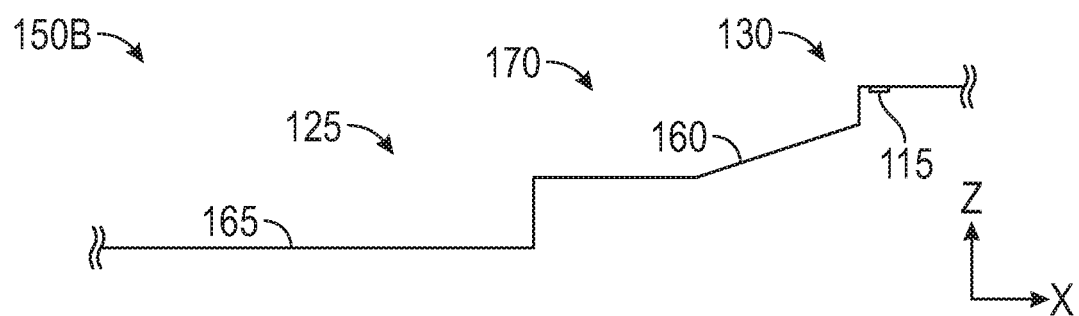

FIG. 7B illustrates a portion of an exemplary longitudinal profile 150B in accordance with some embodiments. The longitudinal profile 150B has a channel 125 with an interior at a flat, horizontal, smooth level 165, and a transition region 170 at a flat, horizontal, and smooth level that, when the slider 100 is installed in a data storage device 10, will be closer than the level 165 to the surface of the media. In the embodiment of FIG. 7B, the funnel region 130 has an interior with a level 160 that, when the ABS 120 is oriented upward, slopes upward from the level of the transition region 170 toward the level of the NFT 115. Within the funnel region 130, the level 160 is smooth and flat, but not horizontal.

Figure 7C:
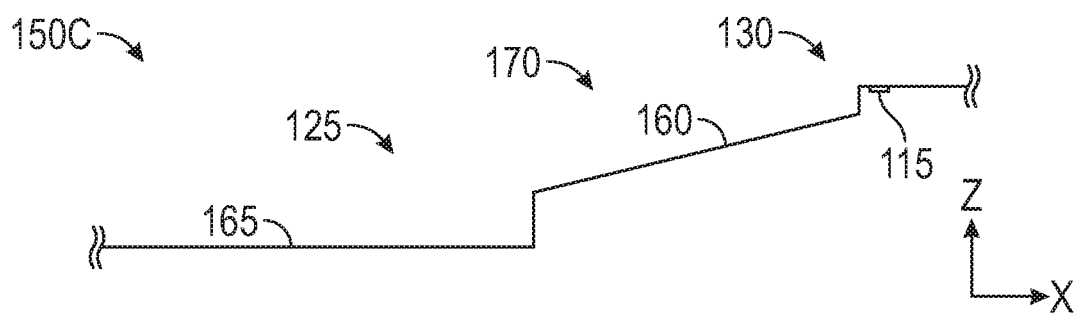

FIG. 7C illustrates a portion of an exemplary longitudinal profile 150C in accordance with some embodiments. The longitudinal profile 150C has a channel 125 with an interior at a flat, horizontal, and smooth level 165. As in the embodiment of FIG. 7A, in the embodiment of FIG. 7C, there is no abrupt transition from the transition region 170 to the funnel region 130. The transition region 170 and funnel region 130 have an interior with a level 160 that, when the ABS 120 is oriented upward, slopes upward toward the level of the NFT 115. Within the transition region 170 and the funnel region 130, the level 160 is smooth and flat, but not horizontal.

Figure 7D:
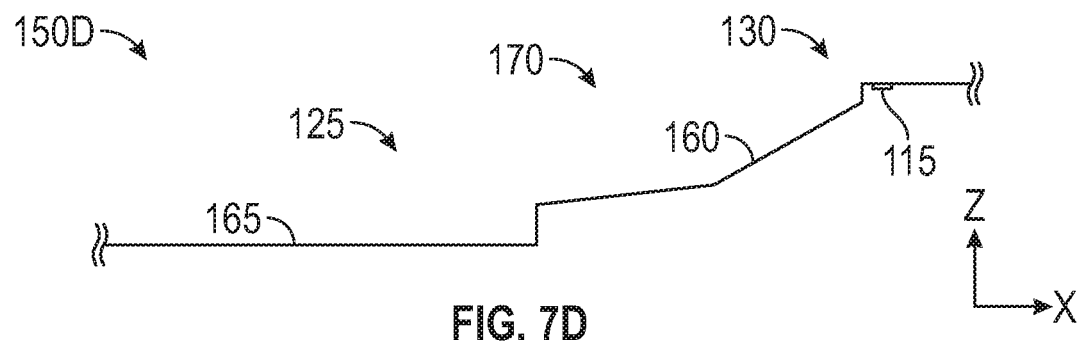

FIG. 7D illustrates a portion of an exemplary longitudinal profile 150D in accordance with some embodiments. The longitudinal profile 150D has a channel 125 with an interior at a flat, horizontal, smooth level 165, and a transition region 170 at a sloped, smooth level that, when the slider 100 is installed in a data storage device 10, will be closer to the surface of the media than the level 165. In the embodiment of FIG. 7D, the funnel region 130 has an interior with a sloped, smooth level 160 that, when the ABS 120 is oriented upward, slopes upward from the transition region 170 toward the level of the NFT 115. Within the funnel region 130, the level 160 is flat but slopes upward when the ABS 120 is oriented upward. FIG. 7D illustrates that the longitudinal profile 150 may include multiple sloped regions or segments.

Figure 7E:
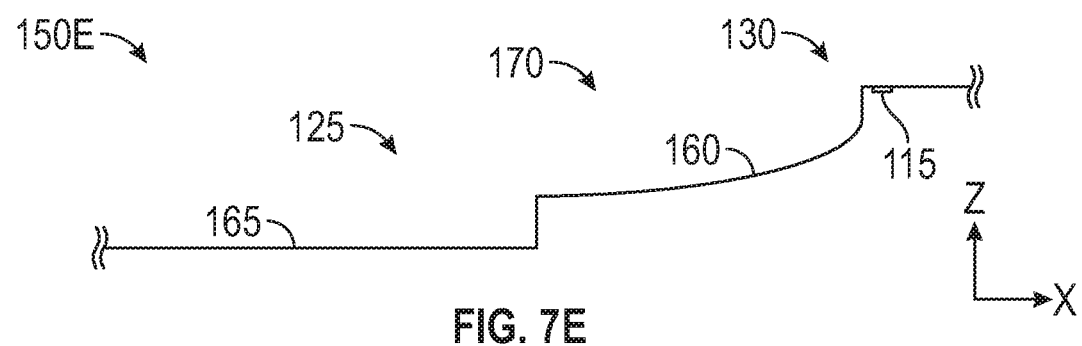

FIG. 7E illustrates a portion of an exemplary longitudinal profile 150E in accordance with some embodiments. The longitudinal profile 150E has a channel 125 with an interior at a flat, horizontal, and smooth level 165. As in the embodiments of FIGS. 7A and 7C, in the embodiment of FIG. 7E, there is no abrupt transition from the transition region 170 to the funnel region 130. The transition region 170 and funnel region 130 have an interior with a level 160 that, when the ABS 120 is oriented upward, slopes upward toward the level of the NFT 115. Within the transition region 170 and the funnel region 130, the level 160 is smooth and has a curvature.

Figure 7F:
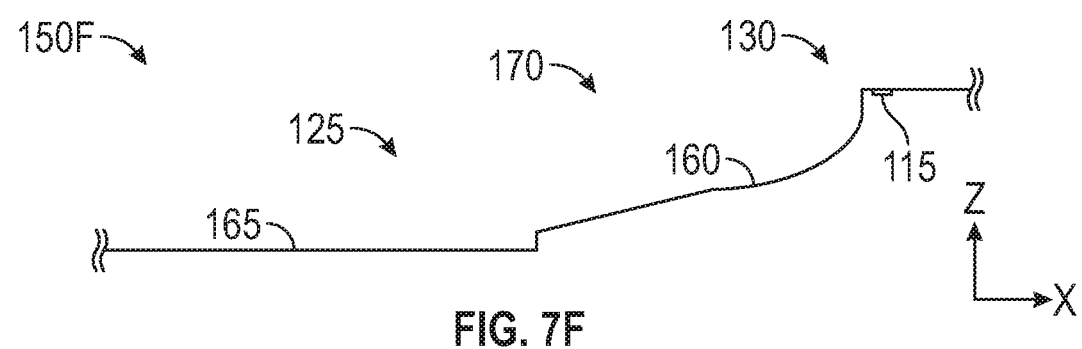

FIG. 7F illustrates a portion of an exemplary longitudinal profile 150F in accordance with some embodiments. The longitudinal profile 150F has a channel 125 with an interior at a flat, horizontal, and smooth level 165, and a transition region 170 at a sloped, smooth level that, when the slider 100 is installed in a data storage device 10, will be closer to the surface of the media than the level 165. In the embodiment of FIG. 7F, the funnel region 130 has an interior with a sloped, curved level 160 that, when the ABS 120 is oriented upward, slopes upward from the transition region 170 toward the level of the NFT 115. Within the funnel region 130, the level 160 is flat but slopes upward with a curvature. FIG. 7E illustrates that the longitudinal profile 150 may include multiple sloped regions or segments, whether linear or curved.

It is to be understood that although the discussion of FIGS. 7A-7F show various characteristics of the funnel region 130 and the level 160, and also the transition region 170, the discussion also applies to the channel 125 and the level 165. Specifically, like the level 160, the level 165 may vary along the x-axis in any manner that promotes one or more of the objectives stated herein (e.g., directing the flow of gas toward the funnel region 130 and NFT 115, increasing the gas pressure near the NFT 115, etc.). Thus, the level 160 may be sloped, flat, smooth, and/or curved.

Simulation results, tabulated below, indicate that the use of the disclosed gas-directing structures (i.e., with a funnel region 130) in sliders 100 increases the gas pressure under NFT 115 by between approximately 41 and 112 percent at various radii.

| NFT 115 pressure near touchdown (atm) | | |
| --- | --- | --- |
| ABS with funnel region 130A | Conventional ABS | Improvement (%) |
| Inner diameter 41 | 29 | 41 |
| Middle diameter 68 | 33 | 106 |
| Outer diameter 89 | 42 | 112 |

As explained previously, the channel 125 and the funnel region 130 may be separated by a transition region 170. It is to be understood that the width of the transition region 170 is not required to have any particular characteristic. Specifically, the width of the transition region 170 is not required to be monotonic, much less monotonically increasing or decreasing as the distance from the NFT 115 increases along the longitudinal axis 140 (i.e., in the −x-direction). In the exemplary embodiments of FIGS. 2A, 3A, 4A, 5A, and 6A, the transition region 170 has a width that decreases monotonically with increasing distance from the NFT 115. In other embodiments, the width of the transition region 170 may change differently with increasing distance from the NFT 115.

Additionally, although FIGS. 7A-7F illustrate a defined transition along the x-axis between the channel 125 and the transition region 170, there is no requirement for such a defined transition. In some embodiments, the transition between one or more of the channel 125, the transition region 170, and the funnel region 130 is smooth (e.g., as shown in FIGS. 7A, 7C, and 7E with respect to the transition region 170 and the funnel region 130). In such embodiments, the demarcation between the channel 125, the transition region 170, and/or the funnel region 130 is somewhat arbitrary. Moreover, as explained previously, there is no requirement for a transition region 170. As discussed previously, however, in some embodiments, the width 180 of the funnel region 130 along the longitudinal axis 140 monotonically increases with increasing distance from the NFT 115. This characteristic defines the funnel region 130 (as distinguished from the channel 125 and, if present, the transition region 170). It is to be understood that the channel 125 and transition region 170 may be one and the same.

It is also to be understood that FIGS. 7A-7F illustrate slices of exemplary sliders 100. The longitudinal profile 150, if taken at a different point along the y-axis, may be different. In other words, there is no requirement for a longitudinal profile to be uniform within the channel 125, transition region 170 (if present), and/or funnel region 130 at different positions along the y-axis. In general, the channel 125, transition region 170, and funnel region 130 may have any interior surface characteristics that promote one or more of the objectives discussed herein (e.g., directing the flow of gas toward the funnel region 130 and NFT 115, increasing the gas pressure near the NFT 115, etc.).

Furthermore, although the exemplary funnel regions 130 illustrated herein are all v-shaped, there is, generally speaking, no requirement for the funnel region 130 to be v-shaped. The funnel region 130 may have any physical characteristics (e.g., size, shape, smoothness, etc.) that increase the concentration of oxygen molecules near the NFT 115 to promote oxidation of the smear.

In the foregoing description and in the accompanying drawings, specific terminology has been set forth to provide a thorough understanding of the disclosed embodiments. In some instances, the terminology may imply specific details that are not required to practice the invention. For example, the materials used in a slider 100 may be different from those described above in various embodiments. Similarly, the processes used to fabricate a slider 100 may be different from those described above in various embodiments. For example, the lithographic processes may differ from those described above.

To avoid obscuring the present disclosure unnecessarily, well-known components (e.g., of a disk drive, a slider, etc.) are shown in block diagram form and/or are not discussed in detail or, in some cases, at all. Unless otherwise indicated herein, prior-art fabrication processes and known materials may be used for the disclosed sliders 100.

Unless otherwise specifically defined herein, all terms are to be given their broadest possible interpretation, including meanings implied from the specification and drawings and meanings understood by those skilled in the art and/or as defined in dictionaries, treatises, etc.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

The term "coupled" is used herein to express a direct connection as well as a connection through one or more intervening circuits or structures. To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one element with respect to other elements. For example, one element disposed "over" or "under" another element may be directly in contact with the other element or may have one or more intervening elements. Moreover, one element disposed "between" two elements may be directly in contact with the two elements or may have one or more intervening elements. In contrast, a first element "on" a second element is in contact with that second element.

The drawings are not necessarily to scale, and the dimensions of the slider 100 may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A slider for a data storage device, the slider comprising:
   a leading edge;
   a trailing edge;
   a near-field transducer (NFT); and
   an air-bearing surface (ABS) comprising:
     a channel configured to direct gas in a direction from the leading edge toward the trailing edge; and
     a funnel region connected to the channel, disposed between the channel and the NFT, and configured to receive gas from the channel,
   wherein:
     in an ABS view of the slider, a width of the funnel region along a longitudinal axis passing through the NFT monotonically increases with distance from the NFT.

2. The slider recited in claim 1, wherein, in an ABS view of the slider, at least a portion of the funnel region has a linear v-shape.

3. The slider recited in claim 1, wherein, in an ABS view of the slider, at least a portion of the funnel region has a curved v-shape.

4. The slider recited in claim 1, wherein the funnel region comprises first and second side walls.

5. The slider recited in claim 4, wherein the first and second side walls intersect.

6. The slider recited in claim 4, wherein the funnel region further comprises a back wall disposed between the first and second side walls.

7. The slider recited in claim 1, wherein, in an orientation in which the ABS is oriented facing upward:
   an interior of the channel is at a first level, and
   an interior of the funnel region is at a second level, the second level being above the first level.

8. The slider recited in claim 1, wherein, in an orientation in which the ABS is oriented facing upward, a longitudinal profile of the ABS taken through the channel and the funnel region comprises:
   a first segment, the first segment being within the channel, and
   a second segment, the second segment being within the funnel region.

9. The slider recited in claim 8, wherein the first segment is below the second segment.

10. The slider recited in claim 9, wherein the first segment is substantially horizontal.

11. The slider recited in claim 10, wherein the second segment is substantially horizontal.

12. The slider recited in claim 10, wherein the second segment is sloped.

13. The slider recited in claim 8, wherein the second segment is substantially horizontal.

14. A data storage device comprising the slider recited in claim 1.

15. A slider for a data storage device, the slider comprising:
- a leading edge;
- a trailing edge;
- a near-field transducer (NFT); and
- a gas-directing structure comprising a v-shaped funnel region configured to, in operation, increase a flow of oxygen molecules between the NFT and a media of the data storage device.

16. The slider recited in claim 15, wherein at least one interior surface of the v-shaped funnel region is linear.

17. The slider recited in claim 15, wherein at least one interior surface of the v-shaped funnel region is curved.

18. The slider recited in claim 15, wherein the gas-directing structure further comprises a channel configured to direct gas into the v-shaped funnel region.

19. The slider recited in claim 18, wherein the v-shaped funnel region comprises a first gas-bearing-surface level and the channel comprises a second gas-bearing-surface level, and wherein, with the slider disposed in the data storage device, a distance between the first gas-bearing-surface level and the media is less than a distance between the second gas-bearing-surface level and the media.

20. A data storage device comprising the slider recited in claim 15.

* * * * *